UNITED STATES PATENT OFFICE.

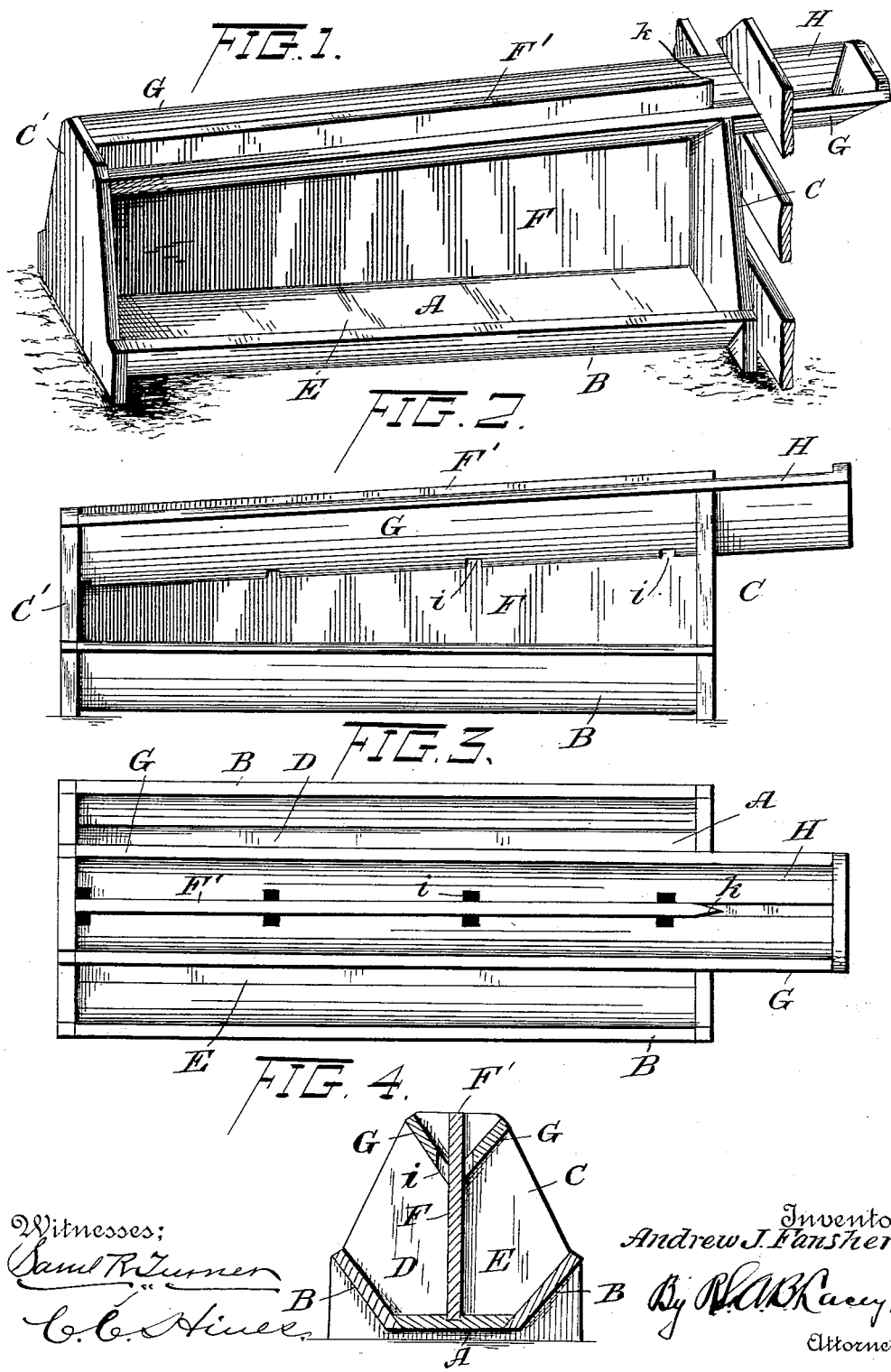

ANDREW J. FANSHER, OF OLIVET, IOWA.

HOG-TROUGH.

SPECIFICATION forming part of Letters Patent No. 633,508, dated September 19, 1899.

Application filed July 11, 1898. Serial No. 685,622. (No model.)

*To all whom it may concern:*

Be it known that I, ANDREW J. FANSHER, a citizen of the United States, residing at Olivet, in the county of Mahaska and State of Iowa, have invented certain new and useful Improvements in Hog-Troughs; and I do hereby declare the following to be a full, clear, and exact description of the invention, such as will enable others skilled in the art to which it appertains to make and use the same.

This invention relates to improvements in troughs for feeding and watering hogs, and has for its object to provide a trough of simple and inexpensive yet peculiar construction, whereby it may be conveniently filled from the exterior of the pen and quickly supplied with food or water throughout its entire length, thereby preventing the animals from crowding at the point of supply and enabling the weaker and smaller animals to obtain their proportionate amount of food and drink.

To this end the invention consists in the novel features of construction and combination of parts hereinafter more fully described, and particularly pointed out in the appended claim.

In the accompanying drawings, illustrating the invention, Figure 1 is a perspective view of the trough. Fig. 2 is a side elevation thereof. Fig. 3 is a top plan view. Fig. 4 is a vertical transverse section.

Referring now more particularly to the drawings, wherein like letters of reference designate corresponding parts throughout the several views, A represents the bottom and B the two outwardly-inclined side pieces of the trough-body, which are suitably connected to and supported by end pieces C and C', said end pieces being extended above the side pieces and made wide enough to afford a strong and stable support to prevent the trough from being overturned. The body of the trough as thus constructed is divided into two separate bins or feed-chambers D and E by a central longitudinal partition F.

Secured to the sides of the partition F adjacent to but a short distance below the upper end thereof are side pieces G, extending outwardly therefrom at an angle and forming therewith a V-shaped runner or conductor, which inclines downwardly from the said end piece C to the opposite end piece C'. The end piece C is higher than the end piece C' and is cut away to form a seat for the runner or conductor and allow the adjoining end of the runner or conductor, which is of somewhat greater length than the trough, to project beyond the same, thereby forming a feeding-in or supply end H, which extends through the panels of the pen to permit of the food or water being conveniently poured thereinto from the exterior. Each side piece of the conductor is provided in or adjacent to its lower edge with a series of openings *i*, located at suitable intervals apart and through which the water or liquid or semiliquid food feeds from the conductor to the feed chamber or compartment therebelow, and said side pieces G are separated by the upper projecting end F' of the partition F, the front end *k* of which is beveled to form a dividing ridge, whereby the food poured into the feeding-in end of the conductor is caused to flow in equal proportions to the opposite sides thereof and thence through the openings therein and down the sides of the partition F to the two feed chambers or compartments D and E.

More or less difficulty is encountered with the form of trough in general use in properly feeding hogs, for the reason that the hogs crowd toward the end of the trough where the slop or water is being poured in, the larger and stronger animals or those nearest the feeding-in end consuming all or the greater part of the food or water before the weaker animals or those farthest away from said end are enabled to get any. Different forms of troughs more or less expensive and cumbersome in construction and effective in operation have been devised with a view to overcoming this difficulty; but my invention accomplishes it in a simple and effective manner.

As the conductor is elevated and the feeding-in end extended to the exterior, the hogs cannot reach the slop or water as it is poured in, and as the conductor is inclined the slop or water flows quickly and is supplied almost simultaneously to all parts of the feed-chambers of the trough, thus enabling the smaller and weaker animals and those nearest the inner end of the trough to get their proper share of the food or drink supplied.

The device comprises a lower feeding-trough and an upper supplying-trough, the latter being inclined throughout its length, so as to convey the feed by gravital action from the receiving end to the opposite or lower end. The troughs have a central disposition, so as to secure an equal distribution of the feed to the lower trough. This arrangement is furthermore advantageous, as it enables the longitudinal partition F to divide each equally, as indicated most clearly in Fig. 4. This partition rises from the bottom of the feeding-trough and extends through the supply-trough to about the level of the sides thereof, its top edge inclining in conformity with the inclination of the supply-trough. It is obvious that either of the feed-chambers D or E can be charged to the exclusion of the other by diverting the supply to one or the other of the supply-chambers formed by the divisional portion F' of the divider F. Thus it is possible to supply drink to one feed-chamber and swill, slop, or other feed to the other feed-chamber.

The trough is simple, durable, and inexpensive in construction and by its use a large number of hogs or other animals may be conveniently fed.

Having thus described the invention, what is claimed as new is—

A stock-feeder, the same consisting of a horizontal trough, uprights closing the ends of the trough and projecting vertically to unequal heights, the higher one being cut away in its top edge, a longitudinal partition rising centrally and vertically from the trough and having its ends abutting against the inner faces of the uprights and its top edge inclining, and having the end adjacent to the higher upright terminating about in the plane thereof and bisecting its cut-away portion, the bisecting portion being beveled from opposite sides to a separating edge, and side pieces secured at their lower edges to opposite sides of the partition a short distance from its top edge and upwardly divergent, forming independent supply-troughs which are open at their top and closed at their ends and which incline longitudinally away from the higher upright, said side pieces projecting at their higher ends beyond the bisecting portion of the partition and the cut-away portion of the upright to form a hopper and having outlet-openings at intervals in their lower edges, substantially as specified.

In testimony whereof I affix my signature in presence of two witnesses.

ANDREW J. FANSHER.

Witnesses:
  W. R. LACEY,
  MARGARET WRIGHT.